United States Patent [19]

Nelson et al.

[11] 4,162,333
[45] Jul. 24, 1979

[54] METHOD AND APPARATUS FOR MAKING FILLED FOOD PRODUCT

[75] Inventors: Richard L. Nelson; Walter P. Nelson, both of Battle Creek, Mich.

[73] Assignee: Mars Incorporated, Mclean, Va.

[21] Appl. No.: 930,757

[22] Filed: Aug. 3, 1978

[51] Int. Cl.² ............ A21C 3/04; A21C 9/06; A21D 8/02
[52] U.S. Cl. .................. 426/283; 99/353; 99/450.7; 264/150; 264/209; 264/323; 425/404; 425/457; 426/284; 426/496; 426/497; 426/514; 426/516
[58] Field of Search .......... 426/279, 280, 281, 283, 426/284, 496, 497, 514, 516, 520, 523; 99/353, 450.7; 425/324.1, 404, 447, 449, 457, 526; 264/142, 150, 209, 234, 236, 323

[56] References Cited

U.S. PATENT DOCUMENTS

| 3,477,851 | 11/1969 | Benson et al. ............ 426/283 X |
| 3,538,840 | 11/1970 | Nelson et al. ............ 426/283 |
| 3,615,675 | 10/1971 | Fowler et al. ............ 426/283 X |
| 3,666,485 | 5/1972  | Nelson et al. ............ 99/450.7 |
| 3,763,765 | 10/1973 | Nelson et al. ............ 99/450.7 |
| 3,894,159 | 7/1975  | Franta .................... 426/284 |

Primary Examiner—Arthur L. Corbin
Attorney, Agent, or Firm—Fisher, Gerhardt & Groh

[57] ABSTRACT

An apparatus and method for making a filled tubular food product in which tubular dough pieces are extruded onto a supporting die member which maintains the internal diameter of the cavity in each dough piece fixed during raising and baking after which said cavity is filled with another relatively softer food product.

4 Claims, 13 Drawing Figures

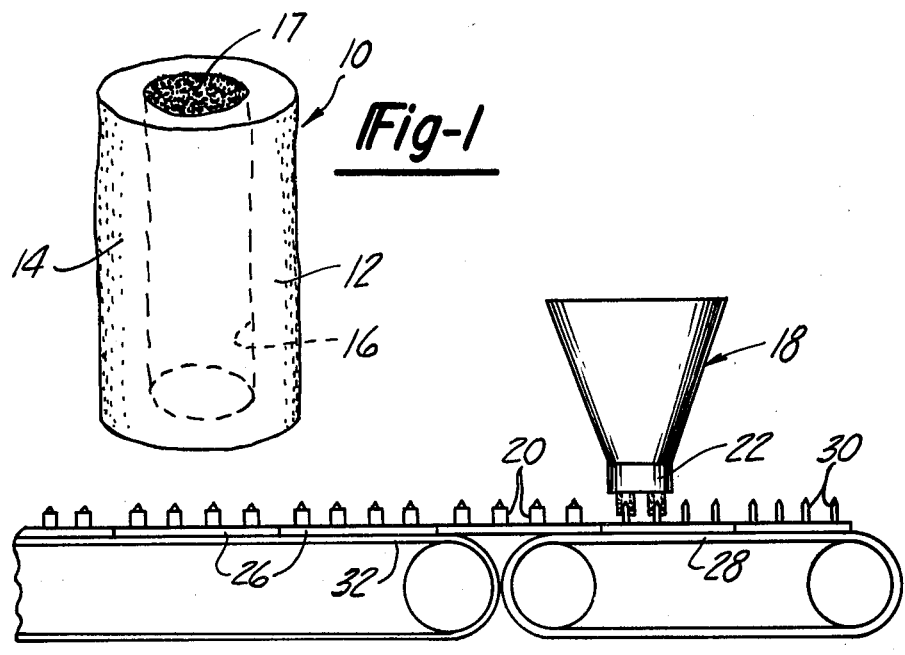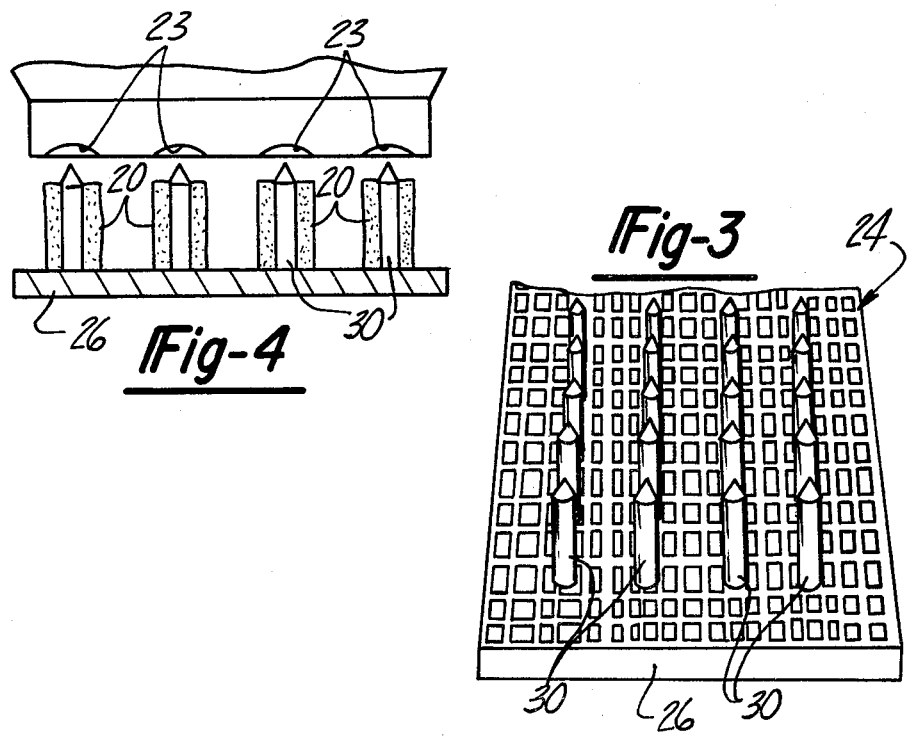

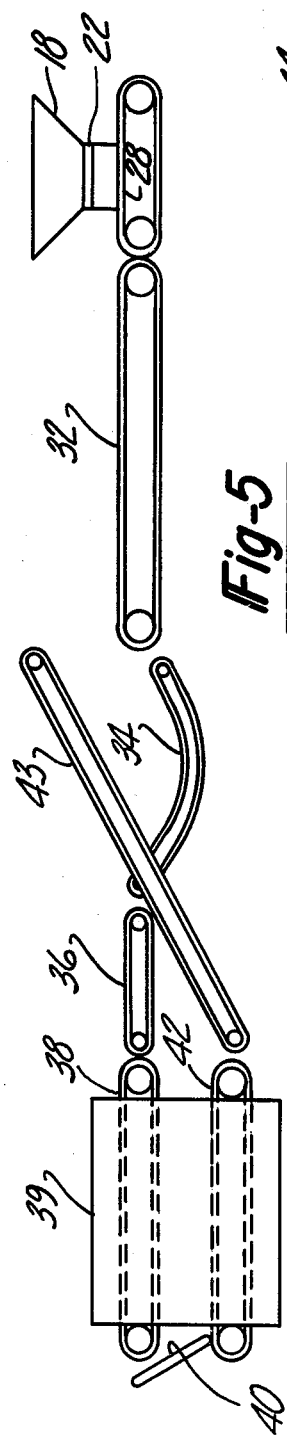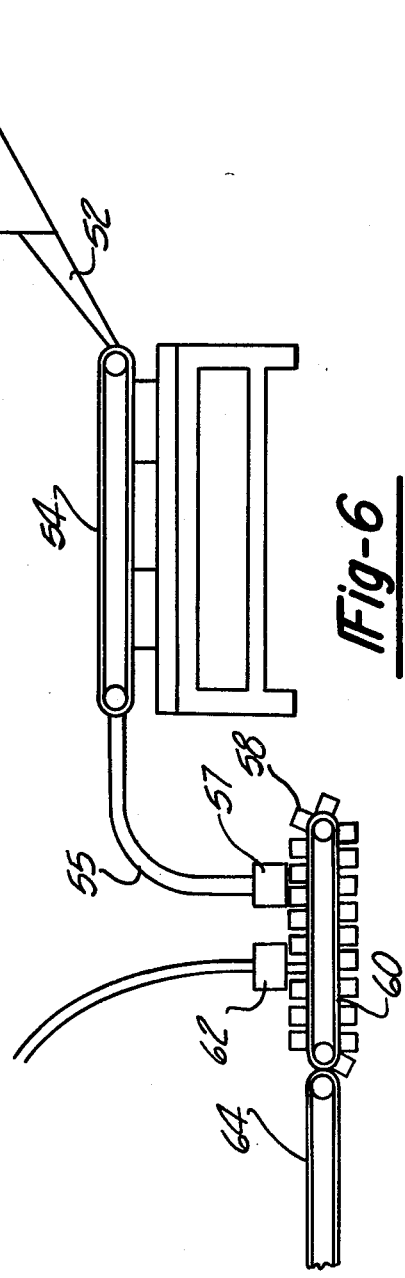

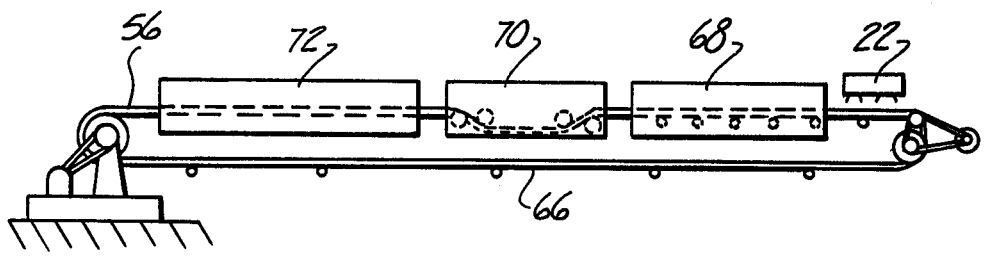
Fig-7
Fig-8
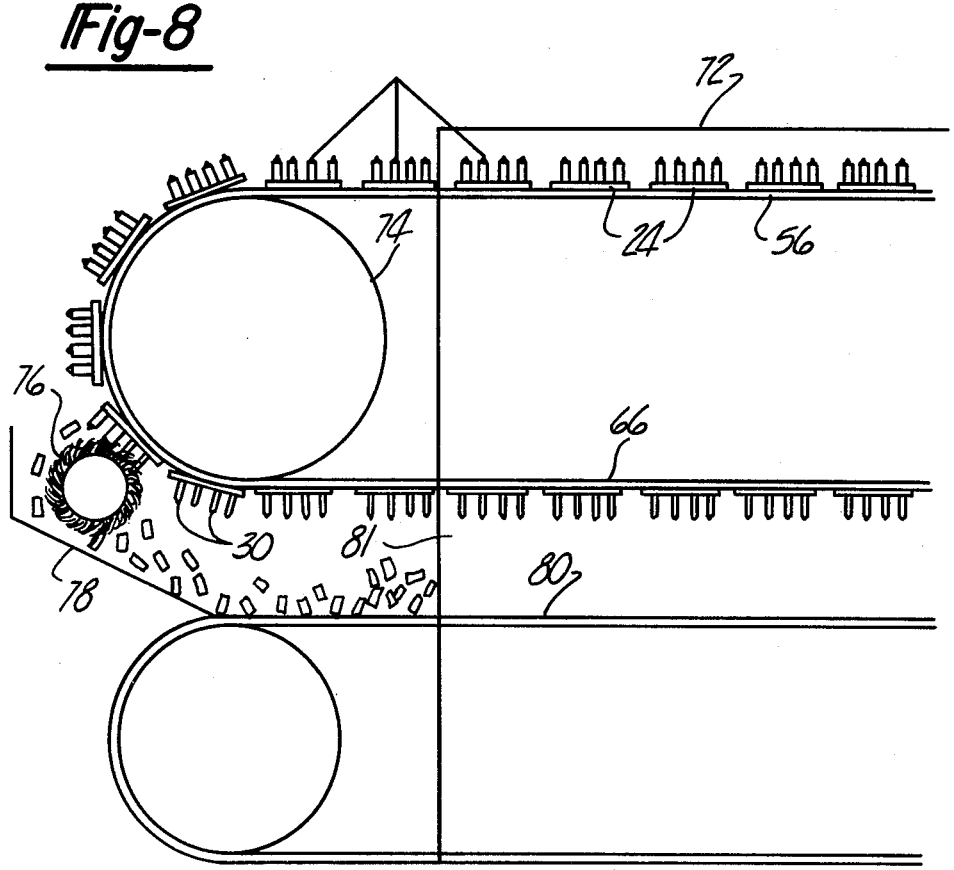

METHOD AND APPARATUS FOR MAKING FILLED FOOD PRODUCT

This invention relates a method and apparatus for making a filled food product and more particularly a food product having a firm, baked, tubular dough portion filled with a relatively softer food material.

This invention is an improvement over our prior U.S. Pat. Nos. 3,538,840, 3,763,765, and 3,666,485 all relating to apparatus and the method for making hollow, pretzels and hard shelled sticks filled with a softer food material such as cheese or the like. In accordance with those patents, baked generally cylindrical members of pretzel-like material are cut off at one end and drilled axially to form a recess into which softer food such as cheese or the like is inserted. Although the apparatus and method disclosed in the patents can be operated effectively at very high speeds a certain amount of waste of materials results from cutting off the ends of the cylindrical members and from drilling the cavity for receiving the soft food material.

Also, the usual procedure for making pretzels is to employ an extruder to extrude pieces of pretzel dough directly onto a traveling belt where the pieces are proofed, that is, the dough rises and the pieces are otherwise made ready for cooking and baking. The extruder dough is too pliable to maintain a cylindrical tube shape and tends to distort due to its own weight. As a result, the exterior shape of the pretzel varies and in the case of elongated tubular food members the axial opening tends to close and the exterior shape is not perfectly cylindrical. These variations cause probems in the manufacture of such filled food products.

It, therefore, is an object of the invention to provide a method and apparatus for forming an article of food having a generally cylindrical tubular member or carrier of firm pretzel-like material filled with a softer food.

Still another object of the invention is to make such a food product in which the carrier is formed in a manner insuring uniformity in size and shape and wherein the food product can be manufactured efficiently and at high speed.

The objects of the invention are accomplished by apparatus and a method for making tubular food products wherein dough pieces in tubular shape are extruded onto supporting die members that hold the tubular dough piece during the time that it is raising and is being baked. Thereafter, the baked member is removed from the die member and is moved relative to a filling apparatus so that filler of a relatively softer food material can be deposited within the cavity formed in the baked tubular member. In one embodiment of the invention the supporting die members are transferred from separated conveyors for extruding, proofing, cooking and baking. In still another embodiment of the invention the supporting die members are all held on a single continuous wire mesh belt acting to transport the die members relative to the extruder and through proofing, cooking and baking zones after which die members return to their starting position, all by the same conveyor. In one form of the invention the baked tubular die members are arranged in end to end relationship and fed to holding means for delivery to a filling station and in still another form of the invention a separate transfer conveyor is employed by which the baked tubular members are moved from one conveying system to the transfer conveyor for cooling and loading into holding means which support the baked tubular dough pieces in position for filling.

These and other objects of the invention will be apparent from the following description and from the drawings in which:

FIG. 1 is a perspective view of a food product made in accordance with the method and apparatus of the present invention;

FIG. 2 is a diagrammatic elevation of a portion of the apparatus used in forming the food product;

FIG. 3 is a perspective view of die assembly forming a part of the apparatus used in making the food product;

FIG. 4 is a cross sectional view taken generally on line 4—4 in FIG. 3 showing the pretzel product on the die assembly;

FIGS. 5 and 6 are diagrammatic elevations of the apparatus employed in making the food product;

FIG. 7 is a view similar to FIGS. 5 and 6 but showing a modified form of the invention;

FIG. 8 is a view at an enlarged scale of a portion of the mechanism seen in FIG. 7;

Figure 9:
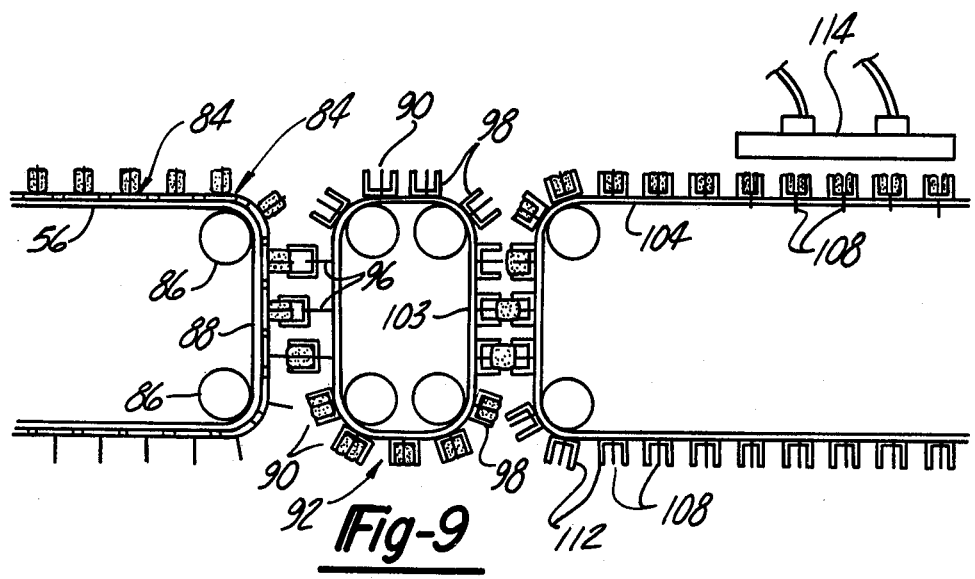
FIG. 9 is a diagrammatic elevation of a modified form of apparatus.

The food product to be made in accordance with the present method and apparatus is designated at 10 and comprises in its finished state a cooked and baked tubular pretzel-like element 12 having a relatively brittle hard surface 14 and an axially extended bore 16. The tubular member 12 forms a carrier element for a softer food product 17 such as cheese which fills the bore 16.

The carrier element 12 may be of various sizes but by way of example can be approximately one inch long with an outside diameter of approximately five-eighths of an inch and an inside diameter of one-quarter of an inch. Preferably the product is made of a pretzel dough and in its finished form the hard surface or crust 14 has granules of salt embedded therein.

The apparatus for making the baked element 12 includes a pretzel dough extruder 18 which periodically ejects a large number of identically shaped tubular dough pieces 20 through a die head 22. By way of example, the die head 22 can have a plurality of die outlets 23 through which the dough pieces are simultaneously ejected. For example, there are four rows of outlets 23 with 45 orifices in each row so that a total of one hundred and eighty dough pieces 20 are ejected in each cycle of operation. Sixty or more such cycles are performed each minute by the extruder 18.

The dough pieces 20 are ejected onto the pretzel tube dies 24 each of which includes a mesh base plate 26 mounted on an elongated conveyor 28. The base plates 26 each have a plurality of stainless steel rods or pegs 30 which are rigidly mounted to the base plate 26 to project vertically therefrom. The pegs have a round cross section and the upper ends of the peg 30 are pointed to more easily receive the bore 16 of the dough pieces 20. The pegs 30 are evenly distributed to correspond to the distribution of the die output orifices 23 of the extruder head 22. The conveyor 28 travels in a path passing under the extruder head 22. Using the same example as used for the extruder, each mesh base plate 26 is provided with four rows of pegs 30 with forty-five uniformly distributed pegs in each of the rows. The rows extend transversely to the direction of movement of the conveyor 28.

The conveyor 28 on which the pretzel tube dies 24 are supported during loading is an indexing feed conveyor driven in timed relationship with the extruder 18. The base members 26 are locked on the conveyor for accurate positioning and indexing under the extruder head 22 to receive the multiplicity of dough pieces 20 which are ejected in each cycle of operation.

The pegs 30 are coated with teflon to facilitate easy reception of the dough pieces 20 and also easy ejection of the cooked and baked product 12 from the pegs 30. As the dough pieces 20 are ejected from the extruder head 22 they drop on the pegs 30 and the dough pieces 20 slide down the peg and settle with one end resting on the mesh base plate 26. As the tube die assembly reaches the end of the indexing conveyor 28, the tube die assemblies 24 are released and passed to a proofing belt 32 where the dough pieces 20 rise or expand. The pegs 30 serve to maintain all the dough pieces 20 in the same vertical altitude and maintain the bores 16 at the same dimension as the outside dimension of the pegs 30. The outside of the dough pieces 20 remain uniform due to the uniform time of proofing and the accurately measured amount of dough in the dough pieces.

Referring now to FIG. 5, after the tube die assemblies 24 have been loaded with dough pieces 20 and the die assemblies reach the end of the proofing belt 32, the dough pieces 20 are fully raised and the tube die assemblies 24 are transferred to a cooker feed belt 34 on which the loaded tube die assemblies are transported through a cooking zone. In the cooking zone the dough pieces are immersed in a hot solution which cooks the dough pieces and adds a glaze to their exterior. Following cooking, the tube die assemblies 24 are again transferred to a conveyor 36 that carries the cooked dough pieces 20 through a salting zone, and thereafter to an oven baking belt 38 which conveys the cooked dough pieces 20 through an oven 39 for a predetermined period of time during which the dough pieces are baked. As the tube die assemblies 24 leave the oven, the baked pretzel tubes 12 are stripped from the tube die assemblies 24 so that the tubes slide down a chute 40 and the empty pretzel tube die assemblies 24 are returned to the timing conveyor 28. The baked tubes 12 are distributed from the chute 40 to a conveyor belt 42 passing the elements 12 through a drying zone of oven 39. Thereafter, the finished tubes 12 are transferred by a conveyor 43 to storage indicated in FIG. 6 at 44.

Referring now to FIG. 6 the tube elements 12 are fed from storage 44 to a hopper 46 and through a chute 52 to a vibratory conveyor 54 which functions to orient the tubular element 12 in end to end relationship to each other. The tube elements 12 are delivered to a conveying tube 55 having a release mechanism 57 at one end. The elements 12 are released into specially designed collets or holding members 58 such as those disclosed in the previously mentioned patents. The holding members 58 are fastened to an indexing belt 60 which passes into a filling position under a manifold filling head 62 that delivers a softer food product such as cheese or the like to the bores 16 of the tubular elements 12. The finished products are then ejected to a take off conveyor 64 which transports the finished food product 10 through cooling or drying zones to storage or packaging.

It will be noted that during the process, the dough pieces 20 remain in position on the pegs 30 of the tube die assemblies 24 until their shape has been fixed by cooking and baking. The pegs 30 insure that the inside diameter remains uniform in all of the tubular elements 12 and also acts to support the uncooked dough of the pieces 20 until their size and shape has been fixed by cooking and baking.

A modification of the invention is shown in FIG. 7 in which the extrusion head 22 deposits dough pieces 22 on pretzel tube die assemblies 24 that are attached to a continuous wire mesh belt 56. The belt 56 passes not only under the extrusion head 22, but also through the proofing zone 68, cooking zone 70 and a baking oven 72. The mesh belt 56 is continuous and of a sufficient length in each of the zones 68, 70 and 72 to insure the required periods of time for proofing, cooking and baking. By employing a single continuous mesh belt 56 the return flight 56 of the belt 56 serves to return the pretzel tube die assemblies 24 to their starting position for reloading by the extruder head 22.

Referring now to FIG. 8, after the baked shells or elements 12 leave the baking zone 72 they are conveyed on the pretzel tube die assemblies 24 which travel with the belt 56 around roll 74. As the tube die assemblies 24 reach an inverted position in or near the lower periphery of the roll 74, a stripper in the form of a brush 76 wipes the elements 12 from pegs 30. The coating of teflon on the stainless steel pegs 30 facilitates easy removal and the elements 12 drop into a chute 78 and are fed by gravity to the flight of a conveyor 80 which moves the elements 12 through a drying chamber 81 employed to reduce the moisture in the product to a desired level.

In the two different arrangements seen in FIG. 5 and FIG. 7, the finished shells or tubular elements 12 can be oriented and subsequently filled on mechanism of the type seen in FIG. 6.

Figure 10:
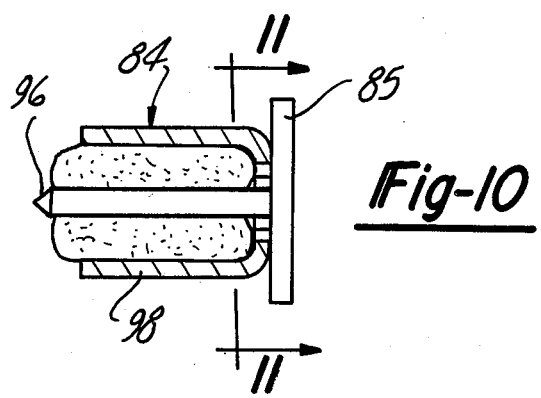
FIG. 10 is an enlarged view of a portion of the mechanism used in FIG. 9.
Figure 11:
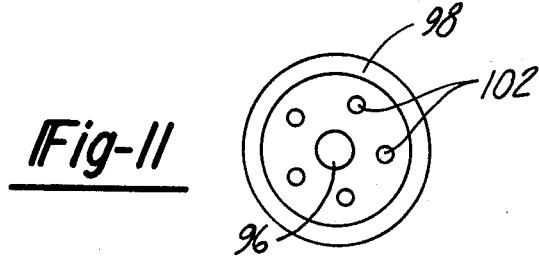
FIG. 11 is a cross sectional view taken on line 11—11 in FIG. 10.

Referring now to FIGS. 9, 10 and 11, a modification of the apparatus is disclosed by which it is unnecessary to orient the tubular elements 12 in end to end relationship and to subsequently load them into collets for filling. Referring to FIG. 9, the mesh belt 56 supports tube die assemblies 84 which are similar to assemblies 24 in that pegs 30 are employed but the pegs are disposed on mesh plates 85 in single rows to permit the use of small turn around rolls 86. The rolls 86 are spaced apart to form a flight section 88 which is disposed generally vertically. During the time that the tube die assemblies 84 travel in the vertical flight 88, the baked tubular shells or elements 12 are transferred from the tube die assemblies 84 to transfer assemblies 90 mounted on a transfer conveyor 92.

Figure 12:
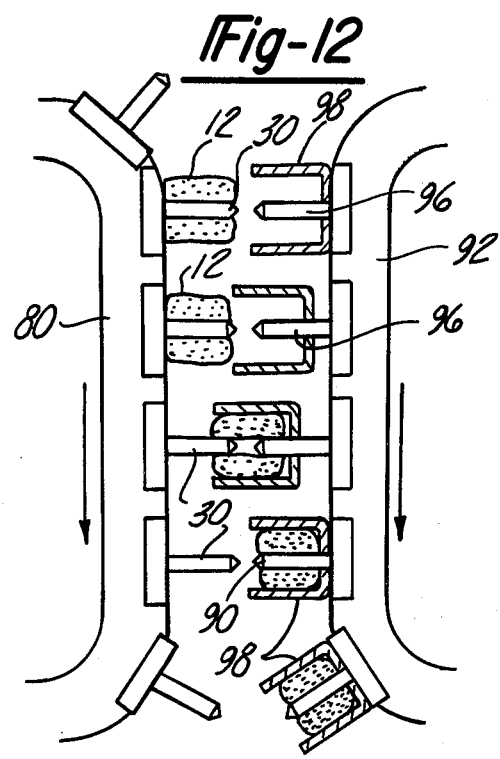
FIG. 12 is a view at an enlarged scale of a portion of the mechanism seen in FIG. 9.

As seen in FIG. 10, transfer assemblies 90 include a base plate 85 on which pegs 96 are mounted. The pegs 96 are identical to pegs 30 but are surrounded by cups 98 which can be moved axially of the pegs 96. The cups 98 served to engage the outer surface or crust 14 of the tubular elements 12. The bottom of the cups 98 are provided with a plurality of openings 102 connected to a source of vacuum which is not shown. The full sequence of transfer of the tubular elements 12 from the pegs 30 to the pegs 96 is shown in FIG. 12. As the pegs 30 and 96 move into axial alignment with each other due to the synchronized and timed relationship of the conveyors 80 and 92, the cups 98 are moved axially relative to pegs 96 by cam means (not shown) until the opening of the cup 98 receives the end of tubular elements 12. Thereafter, the suction in the closed cups 98 due to the vacuum at the openings 102 causes the tubular element 12 to slide from the pegs 30 and the cup 98 to slide on the peg 96 toward each other until the tubular element 12 reaches the bottom of the cup 98. Thereafter, the cups 98 with the tubular elements 12 slide on the pegs 96 until the cups 98 engage the base plate 85. The tubular elements 12 are conveyed in their supported position within the cups 98 and on the pegs 96 to the vertically upward moving flight 103 at the opposite side of the transfer conveyor 92.

Figure 13:
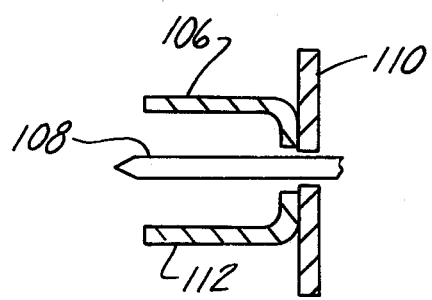
FIG. 13 is a view of transfer assemblies used in the mechanism seen in FIG. 9.

The tubular elements 12 are unloaded from the transfer conveyor 92 to a filling conveyor 104. The filling conveyor 104 is provided with transfer assemblies 106 seen in FIG. 13. Each transfer assembly 106 has a peg 108 retractably supported in a base plate 110. Each peg 108 is surrounded by a cup 112. The transfer conveyor 92 and the filling conveyor 104 with the transfer assemblies 106 are synchronized for movement together so that the pegs 96 and 108 come into alignment with each other during movement through vertical portions of the flights of the conveyors 92 and 104. When the pins or pegs 96 and 108 are aligned, the vacuum at the openings 102 in the cups 98 is terminated and compressed air is supplied. This blows the tubular elements 12 from the cup 98 into the cups 112 and onto the pegs 108. The loaded cups 112 move with the conveyor 104 and as they approach a filling head 114, pegs 108 are withdrawn from the cups 112 and from the bore of the contained tubular elements 12. As the open tubular elements pass under a manifold filling head 114 the bores 16 of the tubular elements 12 are filled with a softer food product such as cheese in a paste or fluid like state which is distributed through the head 114 simultaneously to a plurality of tubular elements 12. Thereafter the filled and completed food products 10 are ejected from the cups 112 and are transferred to a packaging zone. After ejection of the completed food products 10, the pegs 108 are returned to their original position within the cups 112 in readiness to receive tubular elements 12 from the transfer conveyor 92.

The apparatus and method for making a tubular food product has been provided in which dough pieces in tubular shape are extruded onto a supporting die member which supports the tubular dough piece during the time that it is raising and is being baked after which the baked member is removed from the die member and is moved relative to a filling apparatus so that a filler of a relatively softer food material can be deposited within the baked tubular member. In one embodiment of the invention the supporting die members are transferred from an extruding conveyor to a proofing conveyor to a cooking conveyor and to a baking conveyor. In still another embodiment of the invention the supporting die members are all held on a single continuous wire mesh belt acting to transport the die members relative to the extruder and through the proofing, cooking and baking zones and then returns the die members to their starting position. In one form of the invention the baked tubular die members are arranged in end to end relationship and fed to holding means for delivery to a filling station. In still another form of the invention, a separate transfer conveyor is employed by which the baked tubular members are transferred to the cooling and transfer conveyor and subsequently to a filling conveyor without the necessity of aligning the baked tubular members in end to end relationship.

The embodiments of the invention in which an exclusive property or privilege is claimed are defined as follows:

1. The method of making a food article having a tubular body portion of relatively rigid baked dough filled with relatively softer food material, the steps comprising; extruding a plurality of dough pieces each of a tubular cross section and of a predetermined length onto a plurality of support members disposed in an extruding zone to engage the interior of said dough pieces and wherein the exterior of said dough pieces is maintained in an unsupported condition, moving said support members and dough pieces through a baking zone for a predetermined period of time to form tubular body portions, removing the body portions from said support members and returning said support members to said extruding zone, transferring said body portions to holding members, moving said holding members and body portions to a filling zone and filling said tubular body portions with relatively soft food material.

2. The method of claim 1 and further comprising the step of orienting said body portions in end to end relationship with each other following removal of said body portions from said support members.

3. The method of claim 1 wherein said support members are maintained vertically during movement through said baking zone.

4. The method of claim 1 and further comprising the step of conveying said support members and dough pieces through a proofing zone prior to moving said support members and dough pieces through said baking zone to permit said dough pieces to rise and expand on said support members.

* * * * *

UNITED STATES PATENT AND TRADEMARK OFFICE
CERTIFICATE OF CORRECTION

PATENT NO. : 4,162,333
DATED : July 24, 1979
INVENTOR(S) : Richard L. Nelson and Walter P. Nelson It is certified that error appears in the above-identified patent and that said Letters Patent are hereby corrected as shown below:

Abstract, line 1, "An" should read --The--
line 4, "each" should read --the--
line 5, "said" should read --the--
line 6, after "cavity" insert --in the baked dough piece--
Column 3, line 24, "altitude" should read --attitude--
line 57, "element" should read --elements--

Signed and Sealed this

First Day of January 1980

[SEAL]

Attest:

SIDNEY A. DIAMOND

Attesting Officer

Commissioner of Patents and Trademarks